Feb. 25, 1958  J. T. RILEY  2,824,465
GAS PEDAL CONTROL
Filed Jan. 10, 1955
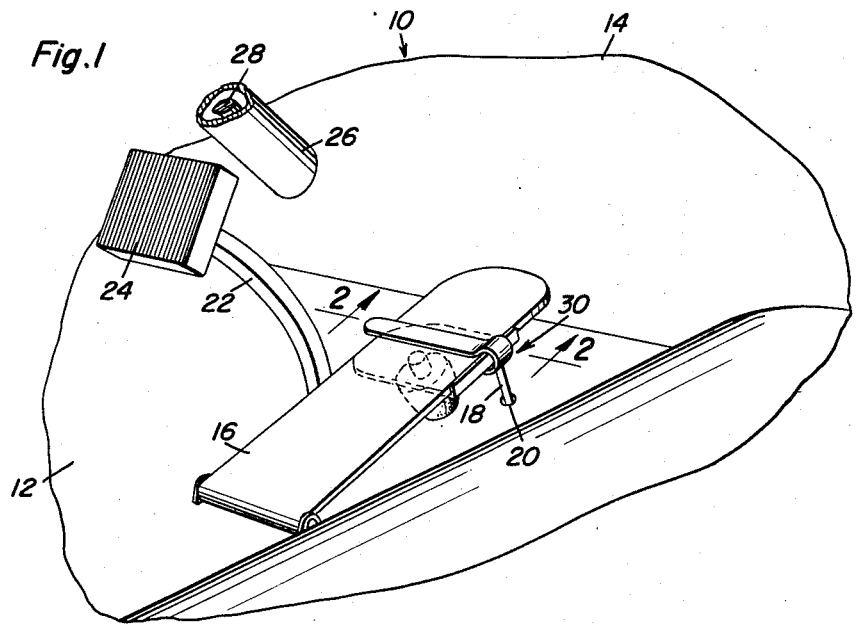
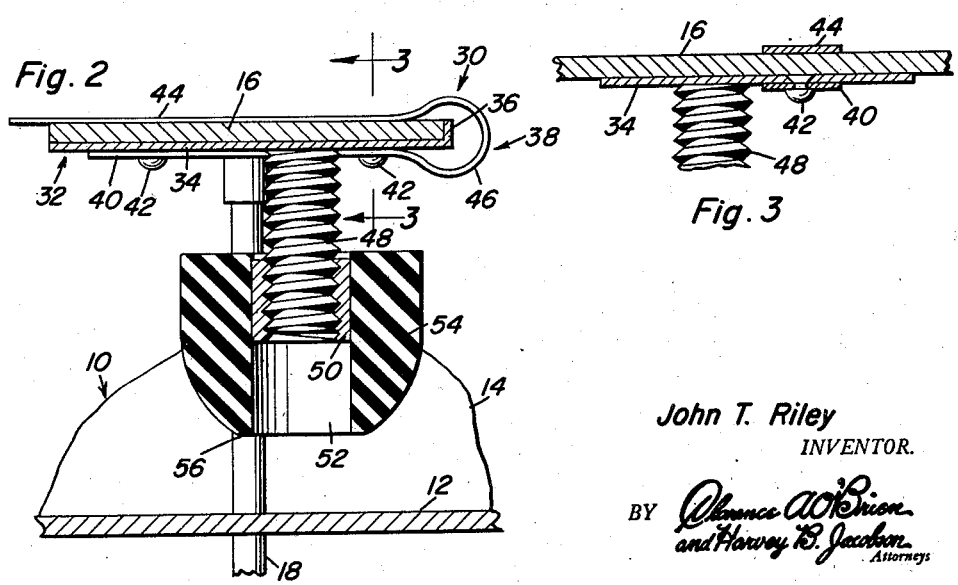
John T. Riley
INVENTOR.

United States Patent Office 2,824,465
Patented Feb. 25, 1958

2,824,465

GAS PEDAL CONTROL

John T. Riley, Washington, Pa.

Application January 10, 1955, Serial No. 480,823

3 Claims. (Cl. 74—526)

This invention relates in general to new and useful improvements in control devices, and more specifically to an attachment for a vehicle gas pedal whereby the maximum speed of the vehicle may be controlled as desired.

It is well-known that one cannot be taught how to drive an automobile without practicing on an automobile. Further, this can be accomplished only by driving the automobile in traffic along with other such vehicles. Therefore, in the training of one in the art of driving a vehicle, it has been found advisable to limit the speed which may be obtained with the practice vehicle. In order to accomplish this there have been made many types of governor devices. However, in many instances, particularly in the case of one learning on the family car, it is desirable to control the maximum speed of the vehicle only when a person is using the vehicle in learning to drive it.

Therefore, it is the primary object of this invention to provide a gas pedal control which is of such a nature whereby it may be easily placed onto and removed from the gas pedal and at the same time is of such a nature whereby it will definitely limit the depression of the gas pedal so as to effectively control the maximum speed of the associated vehicle.

Another object of this invention is to provide an attachment for controlling the depression possible with a vehicle gas pedal, the attachment being of such a nature whereby it may be universally attached to gas pedals of existing vehicles.

Another object of this invention is to provide an improved gas pedal control for controlling the maximum speed of a vehicle, the control being of extremely simple construction and formed of readily obtainable materials so as to be of such a nature that its manufacture is economically feasible.

A further object of this invention is to provide an improved control device for attachment to a gas pedal in order to limit the depressing of the gas pedal, the attachment being adjustable so as to vary the maximum speed obtainable with such a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of the interior of a vehicle body and shows the general details of the gas pedal thereof, the gas pedal having attached thereto the gas pedal control which is the subject of this invention;

Figure 2 is an enlarged fragmentary vertical sectional view taken substantially upon the plane indicated by section line 2—2 of Figure 1 and shows the specific details of the gas pedal control and its relationship with both the gas pedal and the associated floor board of the vehicle; and Figure 3 is an enlarged fragmentary vertical sectional view taken substantially upon the plane indicated by the section line 3—3 of Figure 2 and shows the relationship between the mounting plate of the gas pedal control and the clip and depending threaded member secured thereto.

Referring now to the drawings in detail, it will be seen that there is illustrated in Figure 1 a portion of the interior of a conventional vehicle which is referred to in general by the reference numeral 10. The vehicle 10 includes a floor board 12 and a fire wall 14. Pivotally secured to the floor board 12 is a conventional gas pedal 16 which has connected to a forward portion thereof a carburetor control linkage 18 which passes downwardly through an opening 20 in the floor board 12.

Extending upwardly through the floor board 12 adjacent the gas pedal 16 is a brake control arm 22 which has mounted thereon a brake pedal 24. Carried by the firewall 14 is a steering column 26 having mounted therein a steering shaft 28.

Removably mounted on the gas pedal 16 for controlling the maximum possible depression of the gas pedal 16 is the attachment which is the subject of this invention, the gas pedal control 30.

The gas pedal control 30 includes a mounting plate which is referred to in general by the reference numeral 32. The mounting plate 32 includes a generally rectangular plate 40, 34 which has disposed along one edge thereof an upwardly directed flange 36. The plate portion 34 underlies the gas pedal 16 and the flange 36 engages a side edge of the gas pedal 16 so as to effectively locate the mounting plate 32 with respect to the gas pedal 16.

In order that the mounting plate 32 may be removably secured to the gas pedal 16, there is provided a bifurcated resilient clip which is referred to in general by the reference numeral 38. The clip 38 includes a first leg 40 which underlies the mounting plate 32 and is secured to the plate portion 34 by suitable fasteners 42. The clip 38 also includes an upper leg 44 which is disposed in generally parallel relation with respect to the leg 40 and which resiliently clamps against the upper side of the gas pedal 16 to retain the mounting plate 32 in place. The legs 40 and 44 are resiliently connected together by a bight portion 46.

Secured to the underside of the plate portion 34 and depending therefrom is a threaded member 48. The threaded member 48 is received in an internally threaded sleeve 50 which is in turn secured in a bore 52 of a stop member 54. The stop member 54 has a flat bottom face 56 which is intended to engage the floor board 12 so as to limit downward movement of the gas pedal 16. By so limiting downward movement of the gas pedal 16, it will be readily apparent that the maximum speed of the vehicle 10 may be definitely controlled.

Inasmuch as the stop member 54 is adjustably secured to the mounting plate 32 through the use of the threaded connection between the threaded member 48 and the sleeve 50, it will be seen that the effective length of the stop member 54 and the threaded member 48 may be varied as desired. In this manner the gas pedal 60 may be depressed and may be effectively varied so as to control the maximum speed of the vehicle 10 as desired.

Inasmuch as the entire gas pedal control 30 is retained in place by the resilient clip 38, it will be readily apparent that the gas pedal control 30 may be removed from the gas pedal 16 as desired. Also, because of the particular shape of the mounting plate 32 in relationship to the clip 38 with respect thereto, the gas pedal control 30 may be secured to substantially all vehicle gas pedals.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gas pedal control comprising a mounting plate adapted to be mounted on the under side of a gas pedal, means carried by said mounting plate for securing said mounting plate to a gas pedal, a stop member depending from said mounting plate, said stop member being engageable with a vehicle floor board and adjustable to limit the depression of the gas pedal, said means being in the form of a bifurcated resilient clip having one leg secured to said mounting plate and a second leg adapted to overlie a gas pedal, and a bight portion connecting together said legs, said mounting plate having an upstanding side flange extending through said bight portion and engageable with a gas pedal to position said mounting plate.

2. In combination with a vehicle gas pedal of the type overlying a vehicle floor board, a control device, said control device including a mounting plate underlying said gas pedal, a bifurcated spring clip, said spring clip having one leg secured to an underside of said mounting plate and a second leg overlying said gas pedal releasably clamping said mounting plate to said gas pedal, said gas pedal having a side edge, said mounting plate having a side flange engaging said side edge to position said control device relative to said gas pedal, a threaded member secured to said mounting plate in depending relation, a stop member carried by said threaded member and engageable with said floor board to limit the depressing of said gas pedal, said stop member being adjustable relative to said threaded member whereby the maximum depressing of said gas pedal may be selectively raised.

3. The combination of claim 2 wherein said stop member is formed of a resilient material.

References Cited in the file of this patent

UNITED STATES PATENTS

| | | |
|---|---|---|
| 2,007,217 | Rose | July 9, 1935 |
| 2,124,100 | Bailey | July 19, 1938 |
| 2,332,064 | Duffy | Oct. 19, 1943 |
| 2,349,742 | Macavoy | May 23, 1944 |
| 2,451,700 | Van Trine | Oct. 19, 1948 |
| 2,600,267 | Russito | June 10, 1952 |
| 2,625,051 | Kriseman | Jan. 13, 1953 |
| 2,679,767 | Wasserkrug | June 1, 1954 |
| 2,726,453 | Barrett | Dec. 13, 1955 |